(12) United States Patent
Ito

(10) Patent No.: US 9,374,214 B2
(45) Date of Patent: Jun. 21, 2016

(54) COMMUNICATION APPARATUS, COMMUNICATION SYSTEM, AND COMMUNICATION METHOD

(71) Applicant: KABUSHIKI KAISHA TOSHIBA, Tokyo (JP)

(72) Inventor: Masashi Ito, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/293,207

(22) Filed: Jun. 2, 2014

(65) Prior Publication Data

US 2014/0355629 A1 Dec. 4, 2014

(30) Foreign Application Priority Data

Jun. 4, 2013 (JP) .................. 2013-118230

(51) Int. Cl.
*H04J 3/06* (2006.01)
*H04L 7/00* (2006.01)
*H04L 29/06* (2006.01)

(52) U.S. Cl.
CPC .............. *H04L 7/0008* (2013.01); *H04J 3/065* (2013.01); *H04L 69/28* (2013.01)

(58) Field of Classification Search
None
See application file for complete search history.

(56) References Cited

U.S. PATENT DOCUMENTS

| 2007/0025481 | A1* | 2/2007 | Ryu et al. ....................... 375/354 |
| 2009/0276542 | A1 | 11/2009 | Aweya et al. |
| 2014/0068315 | A1* | 3/2014 | Aweya et al. .................. 713/503 |

FOREIGN PATENT DOCUMENTS

| EP | 0 697 774 | 2/1996 |
| JP | 2009-182659 | 8/2009 |
| JP | 2011-525308 | 9/2011 |
| WO | 2004/038971 | 5/2004 |
| WO | 2010/025743 | 3/2010 |
| WO | 2011/079460 | 7/2011 |

OTHER PUBLICATIONS

Mills, David L., "Internet Time Synchronization: The Network Time Protocol," IEEE Transactions on Communications, IEEE Serivce Center, vol. 39, No. 10, Oct. 1991, pp. 1482-1493.
Fan, Lingang, et al., "The Analysis of Clock Synchronization Protocol on Ethernet," 2011 International Conference on Remote Sensing, Environment and Transportation Engineering, IEEE, Jun. 24, 2011, pp. 826-829.

(Continued)

*Primary Examiner* — Steven H Nguyen
(74) *Attorney, Agent, or Firm* — Nixon & Vanderhye, P.C.

(57) ABSTRACT

There is provided a communication apparatus communicating with a master apparatus generating events at a constant time interval via a network, including: a clocking unit clocking a time; an event generator generating an event based on the clocking unit in accordance with event interval information specifying a time interval for event generation; a storage storing a first timestamp representing a time when the event is generated in the event generator; a receiver receiving, from the master apparatus, a frame containing a second timestamp representing a time of the event generated in the master apparatus; and an event interval corrector correcting the event interval information so as to make a timing of event generation in the event generator closer to a timing of event generation in the master apparatus based on the first timestamp, the second timestamp, and a pre-acquired time difference between the clocking unit and the master apparatus.

6 Claims, 13 Drawing Sheets

(56) References Cited

OTHER PUBLICATIONS

Wang, Kang, et al. "Research and Design on Time Synchronization Technology of Smart Substation Based on IEEE1588," 2011 International Conference on Advanced Power System Automation and Protection, IEEE, Oct. 16, 2011, pp. 2244-2248.

Baoyin, Bian, et al., "Risk Analysis and Research Based on IEEE 1588 in Smart High Voltage Substation," Innovative Smart Grid Technologies—Asia, 2012 IEEE, May 21, 2012, pp. 1-7.

Extended European Search Report for counterpart EP Application No. 14170581.4.

* cited by examiner

COMMUNICATION APPARATUS, COMMUNICATION SYSTEM, AND COMMUNICATION METHOD

CROSS-REFERENCE TO RELATED APPLICATIONS

This application is based upon and claims the benefit of priority from Japanese Patent Application No. 2013-118230, filed Jun. 4, 2013; the entire contents of which are incorporated herein by reference.

FIELD

Embodiments described herein relate to a communication apparatus, a communication system, and a communication method.

BACKGROUND

Some conventional time synchronization systems accurately estimate a difference in time between a master and a slave and adjust the time in the slave so as to eliminate the difference in time. However, when applied in order to synchronize the respective timings for generation of periodic events between the slave and the master, the system may take an excessive amount of time until the synchronization is complete when the difference in time to be corrected is greater than the interval between the events.

Furthermore, other conventional time synchronization systems utilize the amount of time from a timing when an event is generated in the master until a synchronous frame is received from the master to match the timing of event generation in the slave with the timing of event generation in the master, serving as a reference. However, the system fails to accurately match the timing of event generation in the slave with the timing of event generation in the master.

Thus, the conventional systems disadvantageously fail to quickly and accurately match the timing of event generation in the slave with the timing of event generation in the master.

DETAILED DESCRIPTION

According to one embodiment, there is provided a communication apparatus communicating with a master apparatus generating events at a constant time interval via a network, including: a clocking unit, an event generator, a storage, a receiver and an event interval corrector.

The clocking unit clocks a time.

The event generator generates an event based on the clocking unit in accordance with event interval information specifying a time interval for event generation.

The storage stores a first timestamp representing a time when the event is generated in the event generator.

The receiver receives, from the master apparatus, a frame containing a second timestamp representing a time of an event generated in the master apparatus.

The event interval corrector corrects the event interval information to make a timing of event generation in the event generator closer to a timing of event generation in the master apparatus based on the first timestamp, the second timestamp, and a pre-acquired time difference between the clocking unit and the master apparatus.

Hereinafter, embodiments will be described below with reference to the drawings.

First Embodiment

Figure 1:
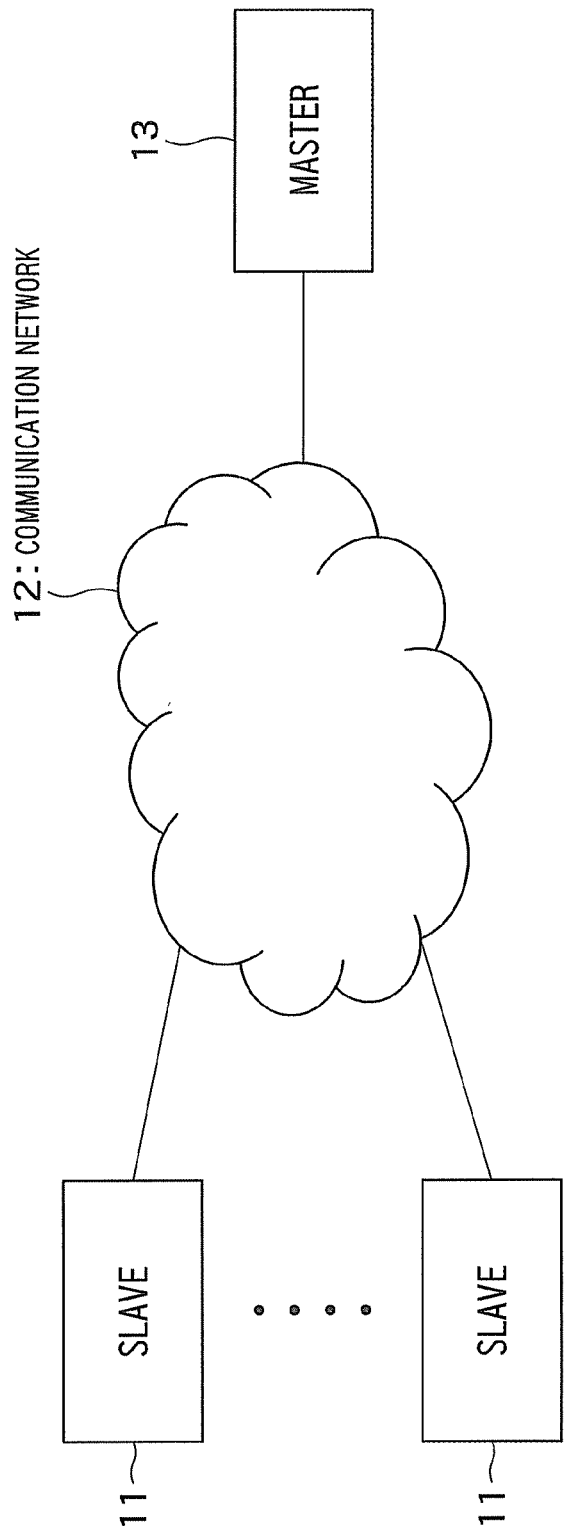
FIG. 1 is a diagram of a network configuration according to a first embodiment.

FIG. 1 shows an example of a general configuration of a communication system according to a first embodiment.

The communication system is a synchronous system including a plurality of slave apparatuses (hereinafter referred to as slaves) 11 and a master apparatus (hereinafter referred to as a master) 13. The slave 11 and the master 13 are communication apparatuses which are connected together via a communication network 12 and between which frames can be transmitted and received.

Events are generated in the slave 11 and in the master 13, and the slave 11 and the master 13 transmit information on the events to each other. The master 13 generates events at a constant time interval. The slave 11 generates events in accordance with event interval information that specifies a time interval for event generation. The slave 11 has a function to carry out a synchronization process cooperatively with the master 13 and appropriately correct the event interval information to accurately synchronize timings for event generation between the slave 11 and the master 13.

The synchronization system is applied to, for example, a protective relay system. In this case, an event refers to measurement of the quantity of electricity (a current value or a voltage value) and the subsequent reporting of the quantity of electricity between protective relays (a slave and a master). However, the first embodiment is not limited to the protective relay system. The first embodiment is applicable to systems in general in which timings for events to be generated need to be synchronous among a plurality of apparatuses.

Furthermore, one or more slaves may be present in a system. The number of masters is also not limited to one but two or more masters may be connected to the system for backup.

The communication network 12 may be either a wireless network or a wired network. Furthermore, protocols for a physical layer and a link layer which are used for the communication network 12 are not limited to a particular protocol.

Figure 2:
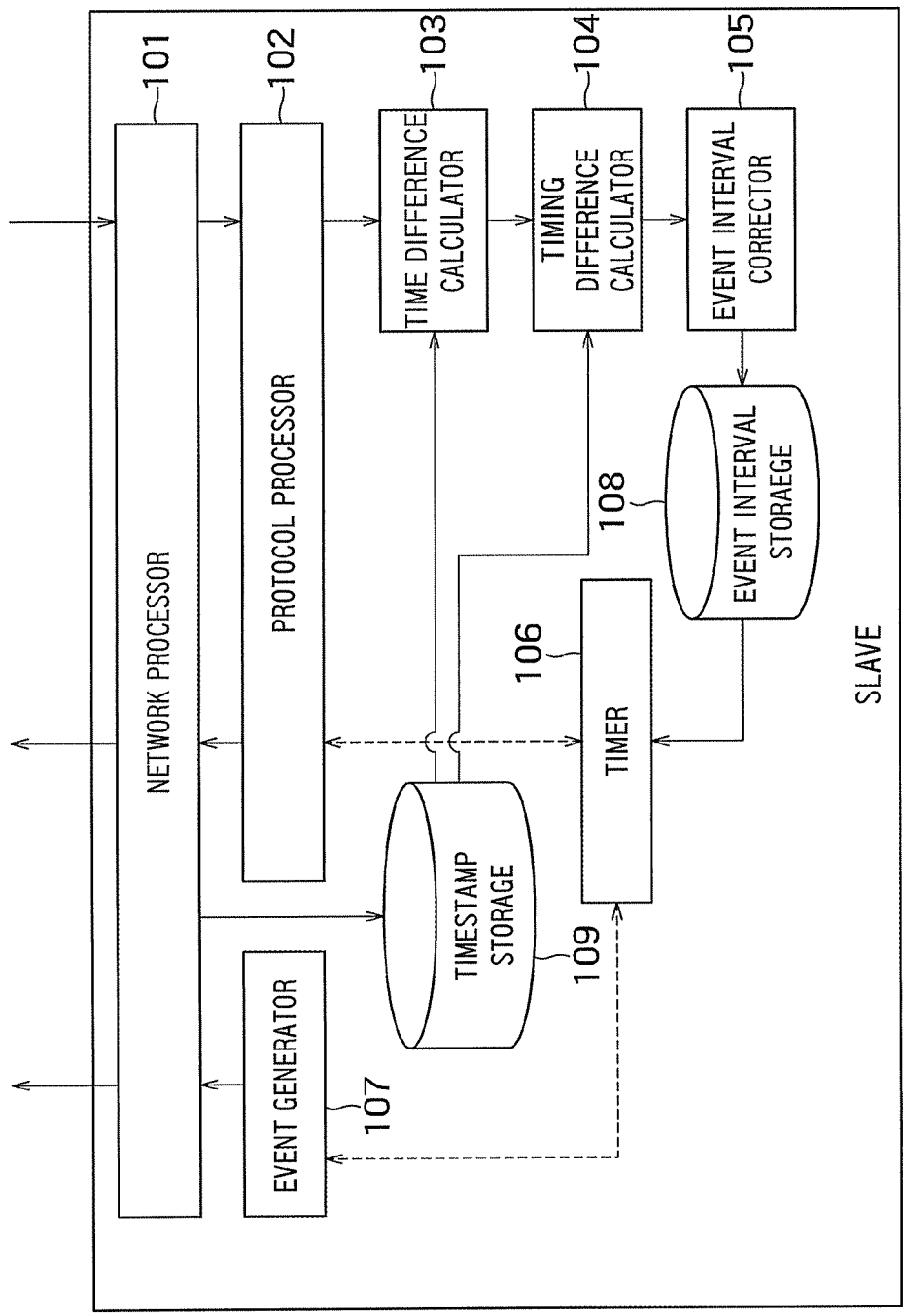
FIG. 2 is a block diagram showing a configuration of a slave according to the first embodiment.

FIG. 2 is a block diagram of a slave according to the first embodiment.

The slave includes a network processor 101, a protocol processor 102, a time difference calculator 103, a timing difference calculator 104, an event interval corrector 105, a timer 106, an event generator 107, an event interval storage 108, and a timestamp storage 109.

The network processor 101 is an interface that transmits and receives frames to and from the communication network. The frames include an event frame that reports the content of an event (for example, the value of the quantity of electricity) and a synchronous frame. Other types of frames may be provided.

The timer 106 has a crystal oscillator and includes a clocking unit that performs time keeping by counting the periods of output signals from the crystal oscillator. The time advances by one at every count.

The network processor 101 includes a function to record a timestamp representing a time when a synchronous frame is transmitted and a timestamp representing a time when a synchronous frame is received. The timestamp represents a time currently indicated by the clocking unit.

The protocol processor 102 processes a common format for information transmitted and received by apparatuses constituting the synchronous system and a procedure for transmission and reception. The protocol processor 102 has a function to pass, to the time difference calculator 103, a timestamp (described below) recorded in a synchronous frame received from a master.

The event interval storage 108 stores event interval information representing a time interval for event generation. As a default value, for example, the same event interval value as that in the master is stored.

The timer 106 generates a signal indicating a timing of event generation when a preset time elapses and transmits the signal to the event generator 107. When the signal is generated, a value for event interval information currently stored in the event interval storage 108 is set as the amount of time until the next event is generated. When the set time elapses, a signal is generated. To set the value in the timer 106, upon the event generator 107 receiving the signal from the timer 106, the value in the event interval storage 108 may be read to set the value as the amount of time until the next event is generated, or after outputting the signal, the timer 106 itself may read the value from the event interval storage 108 and autonomously carry out the setting. An error occurs between the crystal oscillators in the master and the slave, and thus, a speed at which the time advances varies between the master and the slave.

Upon receiving the signal from the timer 106, the event generator 107 generates an event. In the protective relay system, the value of the quantity of electricity measured by a measuring unit (not shown in the drawings) is recorded in an event frame, which is then passed to the network processor 101.

Furthermore, the timer 106 generates a signal indicating a timing for transmission of a synchronous frame and transmits the signal to the protocol processor 102. The amount of time until the signal is generated is set in the timer 106 by, for example, the protocol processor 102. When the amount of time elapses from the time of setting, the timer 106 outputs the signal to the protocol processor 102.

A transmission timing for a synchronous frame may be determined by any method. For example, a signal for a timing for transmission of a synchronous frame may be generated a given time after a signal for a timing of event generation is generated. Alternatively, the signal for the timing for transmission of a synchronous frame may be generated in response to an indication of transmission from the master. Alternatively, the signal for the timing for transmission of a synchronous frame may be generated at a preset constant time interval.

Upon receiving the signal from the timer 106, the protocol processor 102 generates and transmits a synchronous frame to the master via the network processor 101. A timestamp representing a time (count value) of transmission of the synchronous frame (hereinafter referred to as a slave transmission timestamp) may be added to the synchronous frame. Furthermore, a timestamp representing a time when an event is generated in the slave (hereinafter referred to as a slave event generation timestamp) may be contained in the synchronous frame. In this case, the time when the event is generated may be, for example, a time when the latest event is generated before the synchronous frame is transmitted.

The timestamp storage 109 stores the slave event generation timestamp, the slave transmission timestamp, and a timestamp representing a time when a synchronous frame is received from the master (slave reception timestamp). The timestamp storage 109 may also store a timestamp representing a time when the master receives a synchronous frame from the slave (master reception timestamp) and a timestamp representing a time when the master transmits a synchronous frame to the slave (master transmission timestamp). A method for acquiring the timestamps will be described below.

The slave event generation timestamp represents a time when the network processor 101 transmits an event frame in which the quantity of electricity is recorded by the event generator 107. Alternatively, the slave event generation timestamp may represent the time of a timing when the event generator 107 receives a signal for an event or the time of a timing when the value of the quantity of electricity is recorded in the event frame. In this case, the event generator 107 generates the timestamp.

Furthermore, the slave transmission timestamp and the slave reception timestamp represent a time immediately before the network processor 101 transmits a synchronous frame and a time immediately after the synchronous frame is received. The network processor 101 acquires the timestamps. Alternatively, the slave transmission timestamp and the slave reception timestamp may represent a time when the protocol processor 102 processes a transmission frame (synchronous frame) and a time when the protocol processor 102 processes a reception frame (synchronous frame). In this case, the protocol processor 102 acquires the timestamps.

As described below, a synchronous frame received from the master contains the timestamp representing the time when the master receives a synchronous frame from the slave (master reception timestamp), the timestamp representing the time when an event is generated in the master (master event generation timestamp), and the timestamp representing the time when the master transmits the synchronous frame to the slave (master transmission timestamp). When the synchronous frame received by the master from the slave contains the slave transmission timestamp or the slave event generation timestamp, the master transcribes the timestamp to a synchronous frame to be transmitted to the slave.

The time difference calculator 103 utilizes the timestamps passed by the protocol processor 102 (the master reception timestamp and the master transmission timestamp) and the timestamps in the timestamp storage (the slave transmission timestamp and the slave reception timestamp) to calculate a time difference between the slave and the master. The time difference calculator 103 passes the time difference between the slave and the master to the timing difference calculator 104. A configuration is also possible in which the slave transmission timestamp is received from the protocol processor 102. Likewise, a configuration is also possible in which the slave reception timestamp is received from the protocol processor 102 (this will be described below in detail).

The timing difference calculator 104 utilizes the time difference between the timer in the slave and the timer in the master received from the time difference calculator 103, the master event generation timestamp (recorded in the synchronous frame from the master), and the slave event generation timestamp to calculate the amount of time from event generation in the slave until event generation in the master (a difference in timing of event generation between the slave and the master).

The slave event generation timestamp, slave transmission timestamp, and slave reception timestamp stored in the timestamp storage 109 in the slave may be utilized.

However, when the slave transmission timestamp or the slave event generation timestamp is recorded in a synchronous frame transmitted by the slave to the master, the timestamps may be read from a synchronous frame received from the master. This is because the master transcribes the timestamps to a synchronous frame transmitted by the master to the slave. Furthermore, a configuration is possible in which, when the synchronous frame is received from the master, the slave reception timestamp is added to a predetermined field of the synchronous frame, which is then passed by the protocol processor 102. In this case, reading from the timestamp storage is also unnecessary.

The event interval corrector 105 corrects the event interval information to zero or reduce the difference in event timing between the slave and the master received from the timing difference calculator 106. The value in the event interval storage 108 is updated based on the corrected event interval information.

When the timer 106 times out and outputs an event signal, the updated value in the event interval storage 108 is newly set in the timer 106. When the newly set time elapses, the timer 106 outputs the event signal to allow the event generator 107 to generate an event. Hence, event generation in the master can be accurately synchronized with event generation in the slave. At the time when the updated time is set in the timer 106, the value in the event interval storage may be returned to the default value of the event interval (the same event interval value as that in the master). Thus, even when synchronization processes occur less frequently, accurate synchronization with the master can be continued. Additionally, when the event interval information is corrected, correction may be made to a plurality of sets of events on a step by step basis instead of being made to all the events at a time. That is, the event interval information may be corrected each time an event is generated so that the value for the event interval information becomes gradually closer to the calculated value of the event interval each time an event is generated.

Figure 3:
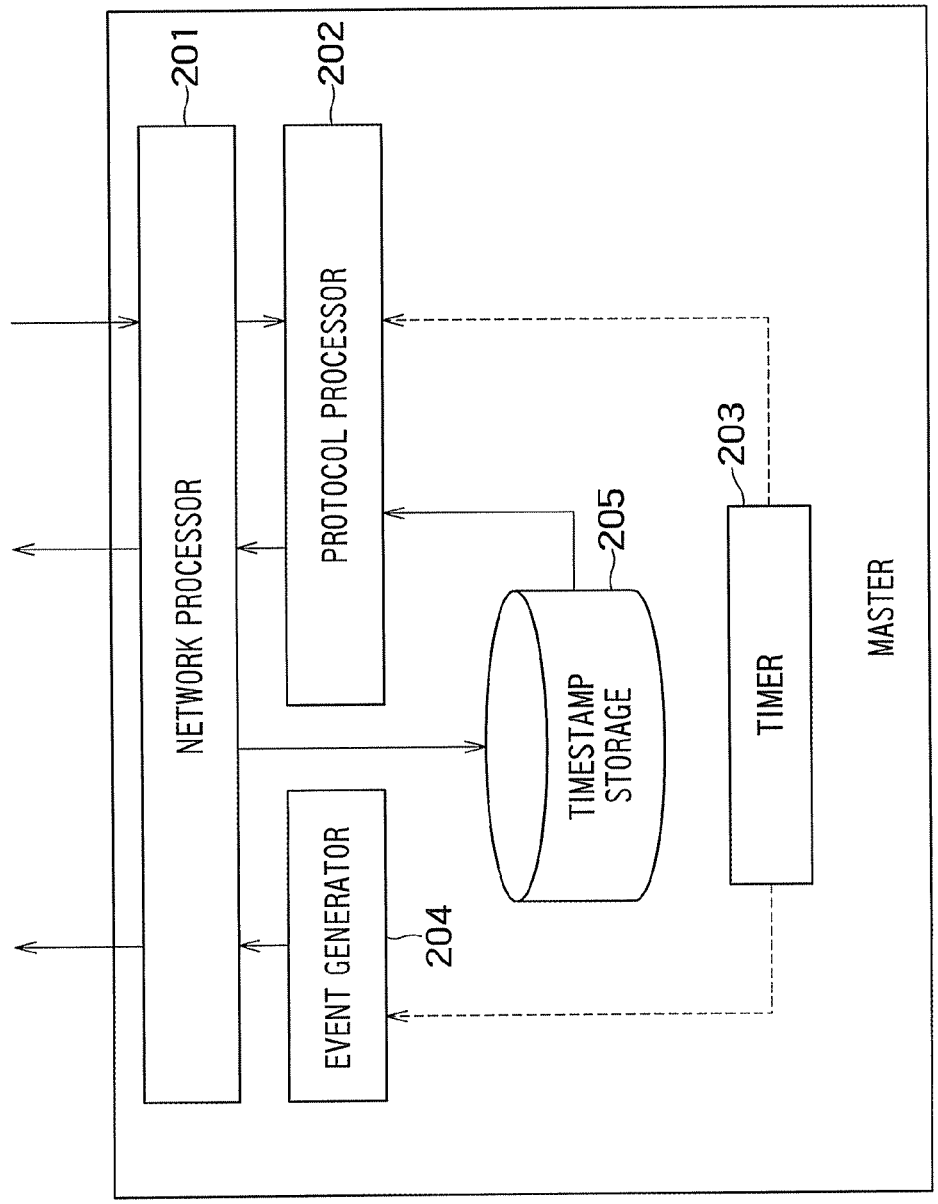
FIG. 3 is a block diagram showing a configuration of a master according to the first embodiment.

FIG. 3 is a block diagram of the master according to the first embodiment.

The master includes a network processor 201, a protocol processor 202, a timer 203, an event generator 204, and a timestamp storage 205.

The network processor 201 is an interface that transmits and receives frames to and from the communication network 12. The types of frames include a synchronous frame and an event frame. Other types of frames may be provided.

The protocol processor 202 processes a common format for information transmitted and received by apparatuses constituting the synchronous system and a procedure for transmission and reception.

The timer 203 generates a signal indicating a timing of event generation each time a given amount of time elapses, and transmits the signal to the event generator 204. The timer 203 includes a crystal oscillator and a clocking unit that performs time keeping by counting the periods of output signals from the crystal oscillator. The description of the first embodiment assumes that a count value represents a time.

The event generator 204 receives a signal from the timer 203 to generate an event. In the protective relay system, the value of the quantity of electricity measured by a measuring unit (not shown in the drawings) is recorded in a frame (event frame), which is then passed to the network processor 201. The network processor 201 transmits the frame to a pre-designated another protective relay apparatus.

The timestamp storage 205 stores the timestamp representing the time when the master receives a synchronous frame from the slave (master reception timestamp), the timestamp representing the time when the master transmits a synchronous frame to the slave (master transmission timestamp), and the timestamp representing the time when an event is generated in the event generator 204 (master event generation timestamp).

The master event generation timestamp represents a time immediately before the network processor 201 transmits an event frame in which the quantity of electricity is recorded by the event generator 204. In this case, the network processor 201 acquires the timestamp. Alternatively, the master event generation timestamp may represent the time of a timing when the event generator 204 receives a signal for an event or the time of a timing when the value of the quantity of electricity is recorded in the event frame. In this case, the event generator 204 acquires the timestamp.

Furthermore, the master reception timestamp and the master transmission timestamp represent a time immediately after the network processor 204 receives a synchronous frame or a time immediately before the network processor 204 transmits a synchronous frame. In this case, the network processor 204 acquires the timestamps. Alternatively, the master reception timestamp and the master transmission timestamp may represent a time when the protocol processor 202 processes a reception frame (synchronous frame) or a transmission frame (synchronous frame). In this case, the protocol processor 202 acquires the timestamps.

Upon receiving a synchronous frame from the slave, the protocol processor 202 generates a synchronous frame to be returned to the slave. The synchronous frame to be transmitted to the slave contains the master event generation timestamp (for example, a timestamp for a time when the latest event is generated), the master reception timestamp, and the master transmission timestamp. When the synchronous frame received from the slave contains the slave transmission timestamp, the slave event generation timestamp, or the like, the timestamp is transcribed to the synchronous frame to be transmitted to the slave. The protocol processor 202 transmits the thus generated synchronous frame to the slave.

Figure 8:
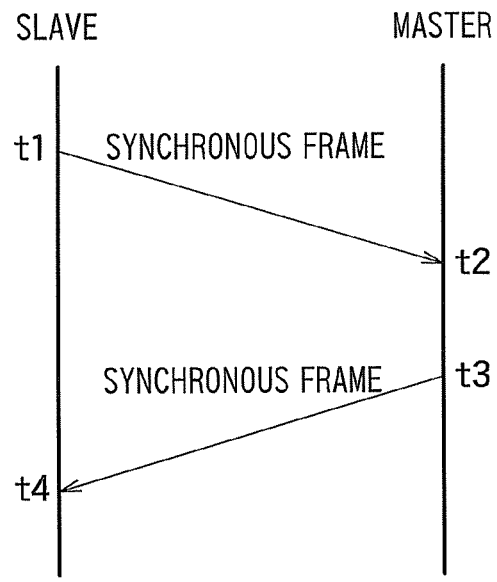
FIG. 8 shows a sequence of synchronous frames according to the first embodiment.

A sequence of exchange of synchronous frames between the slave and the master will be described with reference to FIG. 8.

The slave transmission timestamp is denoted by "t1", and the master reception timestamp is denoted by "t2". The master transmission timestamp is denoted by "t3", and the slave reception timestamp is denoted by "t4". The timestamps are exchanged between the slave and the master via synchronous frames.

The timestamp "t1" may be recorded in a synchronous frame transmitted by the slave, then transcribed to a synchronous frame transmitted by the master, and thus transmitted again to the slave. Alternatively, the timestamp "t1" may be stored in the timestamp storage 109 in the slave without being recorded in the synchronous frame to be transmitted to the master.

The timestamps "t2" and "t3" are recorded in the synchronous frame transmitted by the master. Alternatively, "t3−t2" may be recorded in the synchronous frame. A subtraction is denoted by "−".

In the illustrated sequence, the slave first transmits a synchronous frame, and in response to the synchronous frame, the master transmits a synchronous frame. However, the first embodiment is not limited to this sequence and another sequence is possible. For example, a method is possible in which the master transmits a frame that urges the slave to transmit a synchronous frame before the sequence shown in FIG. 8 is started. Alternatively, the slave and the master transmit synchronous frames to each other in accordance with respective independent timings.

The sequence for synchronous frames is carried out a plurality of times regularly or irregularly instead of being carried out only once.

Operations of the slave shown in FIG. 2 will be described below in detail.

Figure 4:
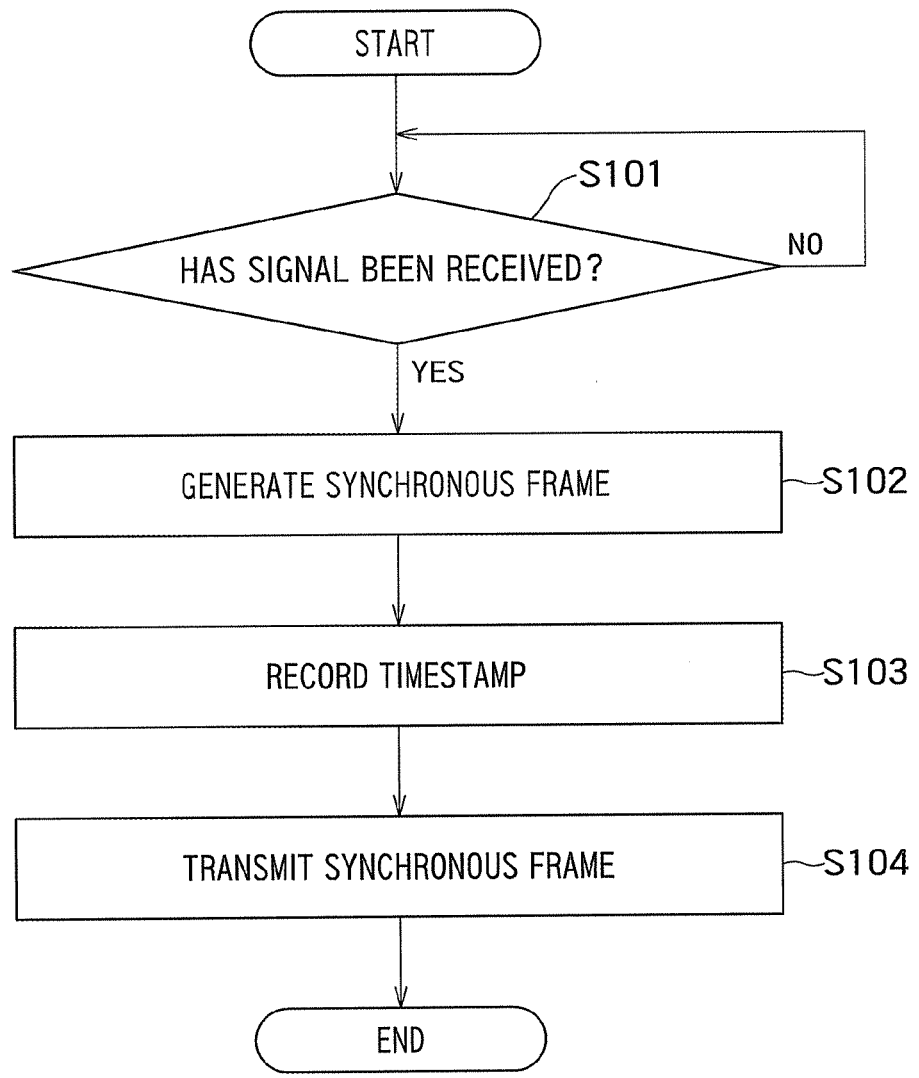
FIG. 4 is a flowchart of a process of transmitting a synchronous frame by the slave according to the first embodiment.

FIG. 4 is a flowchart showing an operation of the slave during transmission of a synchronous frame.

First, the protocol processor 102 waits until the protocol processor 102 receives, from the timer 106, a signal indicating that a period for transmission of a synchronous frame has come (step S101).

Thereafter, the protocol processor 102 receives a signal from the timer 106, then generates a synchronous frame destined for the master, and passes the synchronous frame to the network processor 101 (step S102). At this time, the protocol processor 102 may set a time for generation of the next synchronous frame in the timer 106.

Then, the network processor 101 records, in the timestamp storage 109, the timestamp (slave transmission timestamp) "t1" representing the time when a synchronous frame is to be transmitted (step S103). Alternatively, the timestamp "t1" may be recorded in the synchronous frame to be transmitted instead of being recorded in the timestamp storage 109. The generation of the timestamp may be carried out by the protocol processor 102 during generation of a synchronous frame. The slave event generation timestamp may be recorded in the synchronous frame.

Then, the network processor 101 transmits the synchronous frame to the master (step S104).

Figure 5:
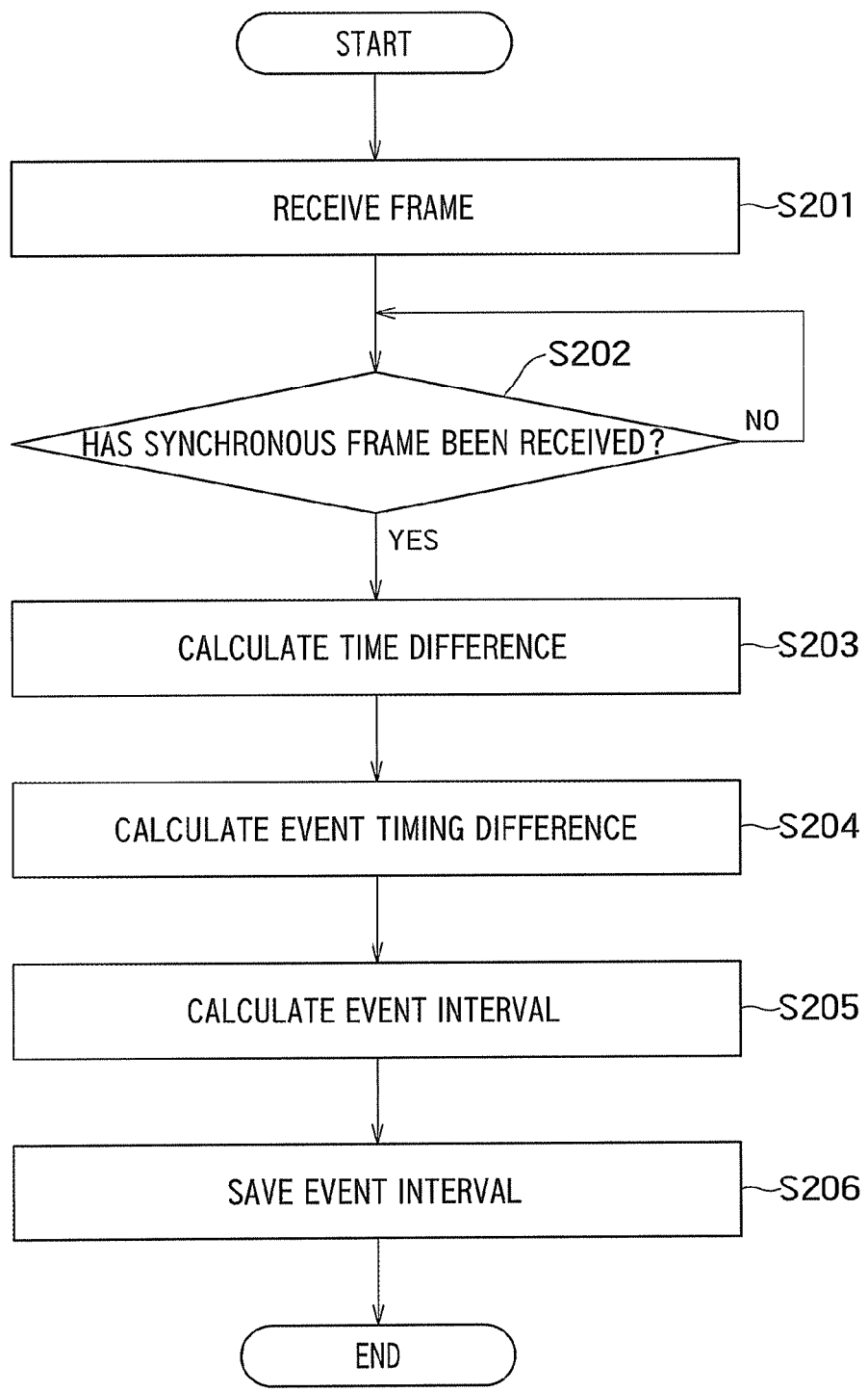
FIG. 5 is a flowchart of a process of receiving a synchronous frame by the slave according to the first embodiment.

FIG. 5 is a flowchart showing an operation of the slave during reception of a synchronous frame.

First, the network processor 101 receives a frame and passes the received frame to the protocol processor 102. At this time, the timestamp (slave reception timestamp) "t4" representing the time of reception of the frame is recorded in the timestamp storage 109 (step S201). A configuration is also possible in which the timestamp "t4" is additionally recorded in a predetermined field in the received frame instead of being recorded in the timestamp storage 109.

Then, the protocol processor 102 determines whether or not the received frame is a synchronous frame (step S202). When the received frame is not a synchronous frame, the protocol processor 102 carries out processing depending on the type of the frame, and the system waits again to receive a frame. In this case, the timestamp "t4" recorded in the timestamp storage 109 may be erased. When the timestamp "t4" is additionally recorded in the frame, the timestamp "t4" may be neglected during processing of the frame.

When the frame received from the master is a synchronous frame, a plurality of timestamps recorded in the synchronous frame is read and passed to the time difference calculator 103. Furthermore, the timestamps may be stored in the timestamp storage 109.

The timestamps recorded in the synchronous frame received from the master include the master reception timestamp "t2", the master transmission timestamp "t3", and the master event generation timestamp. When the difference in timestamp "t3−t2" is recorded instead of the timestamps "t2" and "t3", the value "t3−t2" is passed to the time difference calculator 103 instead of the timestamps "t2" and "t3". The value "t3−t2" may be stored in the timestamp storage 109. Furthermore, when the synchronous frame received from the master contains the slave transmission timestamp "t1" or the slave event generation timestamp, the timestamp is also passed to the time difference calculator 103.

Then, the time difference calculator 103 utilizes the timestamps "t1", "t2", "t3", and "t4" to calculate the difference in time between the slave and the master (step S203). When the timestamps "t1" and "t4" are not received from the protocol processor 102, the timestamps "t1" and "t4" are acquired by being read from the timestamp storage 109. A method for calculating the time difference between the slave and the master will be described below.

The time difference calculator 103 passes the calculated time difference and the master event generation timestamp passed by the protocol processor 102, to the timing difference calculator 104.

When receiving the result of the timestamp "t3−t2", the time difference calculator 103 may receive the result of "t4−t1" from the protocol processor 102 instead of the timestamps "t1" and "t4" and calculate the time difference utilizing the result. A configuration is also possible in which the result of "t4−t1" is received from any processor that can access the timestamp storage 109 rather than from the protocol processor 102.

Now, the method for calculating the time difference between the slave and the master in step S203 will be described in detail.

First, a delay in communication between the master and the slave is calculated, and the current time in the master (the time in the master when the time in the slave is "t4") is calculated using the communication delay and the timestamp "t3". Moreover, the time difference between the slave and the master is defined as the current time in the slave (timestamp "t4") minus the calculated current time in the master. For example, the following calculation is carried out.

$$\text{Communication delay} = \frac{(t4 - t3) + (t2 - t1)}{2}$$

Current time in master="t3"+communication delay

Time difference between slave and master=current time in slave−current time in master In the above-described example of calculation of communication delay, the difference ("t2−t1") and the difference ("t4−t3") are added together to determine a roundtrip time, which is then halved to obtain a communication delay in one way. The meanings of the timestamps "t1", "t2", "t3", and "t4" are as described above with reference to FIG. 8. Any calculation method may be used as long as the method utilizes "t1", "t2", "t3", and "t4".

A more accurate method for calculating the communication delay and the time difference between the slave and the master will be illustrated. For example, based on a sequence of past N exchanges of a synchronous frame, the following calculation can be carried out.

$$\text{Communication delay} = \frac{\min(t4_i - t3_i) + \min(t2_j - t1_j)}{2}$$

Time difference between slave and master=
$t4_{arg\,min(t4_i-t3_i)} - \{t3_{arg\,min(t4_i-t3_i)} + \text{Communication delay}\}$ The smallest one of the values "t2−t1" for N synchronous frames that have been transmitted from the slave to the master is denoted by "$\min(t2_j-t1_j)$" (one of the numbers 1 to N is denoted by "j"). The smallest one of the values "t4−t3" for N synchronous frames that have been transmitted from the master to the slave is denoted by "$\min(t4_i-t3_i)$" (one of the numbers 1 to N is denoted by "i").

Selection of the respective smallest values allows selection of synchronous frames with the shortest communication delay from the synchronous frames transmitted from the slave to the master and from the synchronous frames transmitted from the master to the slave.

Short communication delays in both directions mean that the communication delays in the two directions are likely to be the same or very close.

Halving the roundtrip delay for synchronous frames with a maximally equal communication delay allows the calculated communication delay in one way to be made closer to the real delay in the communication between the master and the slave.

The time difference between the slave and the master can be calculated as described above using "$t3_{argmin("t4"i-"t3"i)}$" obtained when "t4−t3" results in the smallest value and "$t4_{argmin("t4"i-"t3"i)}$" obtained when "t4−t3" results in the smallest value.

Depending on a tolerance for the accuracy of the calculation result for the communication delay, a certain range of values may be allowed for the selection, for example, not only the smallest value for the past N synchronous frames but also the second smallest value may be selected.

Then, in step S204 in FIG. 5, the timing difference calculator 104 uses the time difference between the slave and the master passed by the time difference calculator 103, the master event generation timestamp, and the slave event generation timestamp stored in the timestamp storage 109 to calculate the amount of time from event generation in the slave until event generation in the master (the difference in timing of event generation between the slave and the master). A configuration is also possible in which the slave event generation timestamp is received from the protocol processor 102 via the time difference calculator 103. The timing difference calculator 104 passes the calculated timing difference between the events in the slave and the master to the event interval corrector 105.

Figure 9:
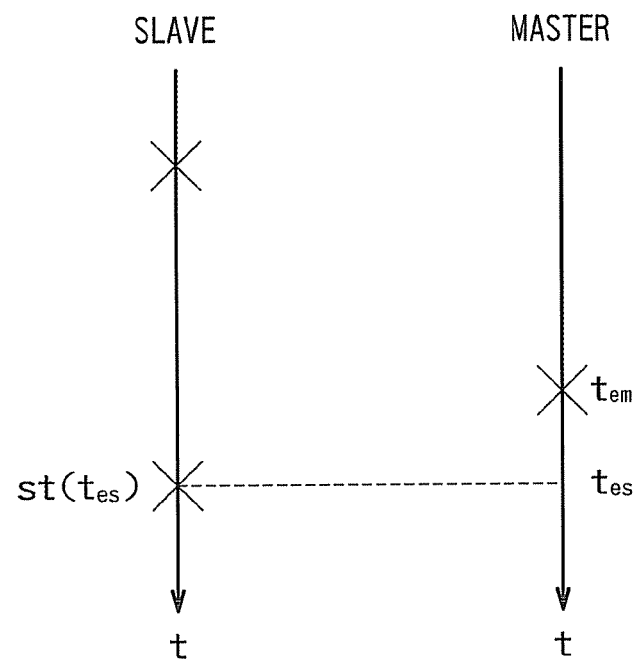
FIG. 9 is a diagram showing a relation between a time difference and an event timing difference according to the first embodiment.

A method for calculating the timing difference between events in the slave and the master will be described. FIG. 9 is a diagram illustrating the difference between the time difference between the slave and the master and the timing difference between events in the slave and the master.

Any time in a master reference time is denoted by "t". A time in a slave reference time at the time "t" in the master reference time is denoted by "st(t)". Event generation is denoted by "x".

An event generation time in the master in the master reference time is denoted by "tem".

An event generation time in the slave in the master reference time is denoted by "tes".

An event generation time in the slave in the slave reference time is denoted by "st(tes)".

In this case, the master event generation timestamp corresponds to "tem", and the slave event generation timestamp corresponds to "st(tes)". Furthermore, a time difference between the slave and the master observed when the time in the master reference time is "tes" is "tes−st(tes)". The time difference corresponds to a value received from the time difference calculator 103.

The timing difference between the slave and the master based on the master reference time is "tes−tem". However, "tes" is a time in the master reference time when an event is generated in the slave and thus fails to be measured. Thus, using the value of the time difference (="tes−st(tes)") between the slave and the master, the amount of time from the event generation in the slave until the event generation in the master (the timing difference between the slave and the master) is expressed as follows.

The amount of time from the event generation in the slave until the event generation in the master=*st*(*tes*)−*tem*−(the time difference between the slave and the master)

The method for calculating the timing difference between events in the slave and the master has been described.

Then, in step S205, the event interval corrector 105 corrects the event interval based on the amount of time from event generation in the slave until event generation in the master (the timing difference between events in the slave and the master).

For the correction of the event interval, the value of the event interval currently set in the event interval storage 108 is corrected to reduce the amount of time from the event generation in the slave until the event generation in the master (the timing difference between the events in the slave and the master), for example, to zero the amount of time. For example, when the timing difference between the events in the slave and the master is "x" (or "−x"), the event interval is reduced (or increased) by "x". Alternatively, the event interval may be reduced (increased) a plurality of times so that the event interval decreases (increases) by "x" in total through a number of event generations.

Then, the event interval corrector 105 saves the corrected event interval to the event interval storage 108 (step S206). When the timer 106 times out at the value currently set in the timer 106, the corrected value of the event interval in the event interval storage 108 is then set in the timer 106. After the corrected time is set in the timer 106, the value in the event interval storage 108 may be set equal to the default value of the event interval (the same event interval value as that set in the master). Thus, even with infrequent synchronization processes, the slave can be kept accurately synchronized with the master.

In this case, the timing difference between the events in the slave and the master calculated in step S204 described above is desirably the amount of time between an event in the slave and an event in the master temporally closest to the event in the slave. The event in the slave as used herein may be any event, for example, the last event generated before transmission of a synchronous frame to the master, the latest event generated immediately before reception of a synchronous frame from the master or the like. The event in the master close to the event in the slave may be an event in the master to be generated in the future instead of an already generated event.

The master event generation timestamp "tem" (see FIG. 9) obtained from the synchronous frame may not be indicative of the time of generation of the event in the master temporally closest to the event in the slave. Thus, a manner of determining the amount of time between the event in the slave and the temporally closest event in the master (timing difference) will be illustrated.

Figure 10:
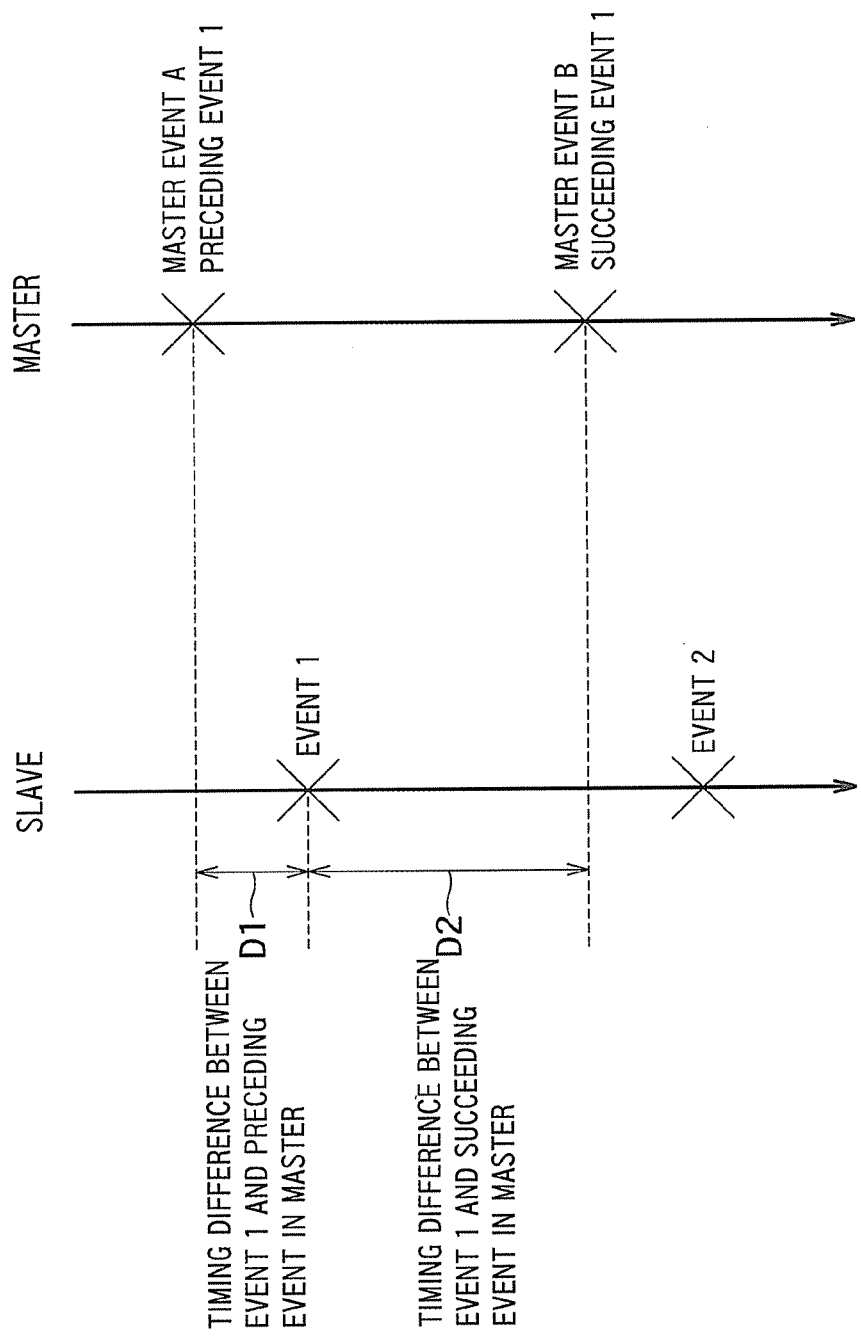
FIG. 10 is a diagram showing a relation between temporally close events in the slave and the master according to the first embodiment.

First, the event in the master temporally closest to the event in the slave will be described with reference to FIG. 10.

An event A in the master precedes an event 1 in the slave, and an event B in the master succeeds the event 1 in the slave. The preceding event A in the master has a smaller time difference from the event 1 than the succeeding event B in the master. The preceding event A is defined as the event in the master temporally closest to the event 1 in the slave.

In contrast, when the succeeding event B in the master has a smaller time difference from the event 1, the succeeding event is defined as the event in the master temporally closest to the event 1.

As is obvious, neither an event generated before the preceding event A in the master nor an event generated after the succeeding event B is the event in the master temporally closest to the event 1 in the slave.

In this case, an event in the master with the timestamp "tem" (see FIG. 9) obtained from a synchronous frame may not indicate the time of an event temporally closest to the event in the slave. This is because an amount of time elapses from recording of the master event generation timestamp in a synchronous frame until the slave receives the synchronous frame. Thus, it is unknown which of the events in the slave is temporally closest to the master event generation timestamp recorded in the synchronous frame. The event timing difference obtained by the calculation method illustrated in the description of step S204 may indicate an amount of time from event generation in the slave which corresponds to a plurality of events in the master.

Figure 11:
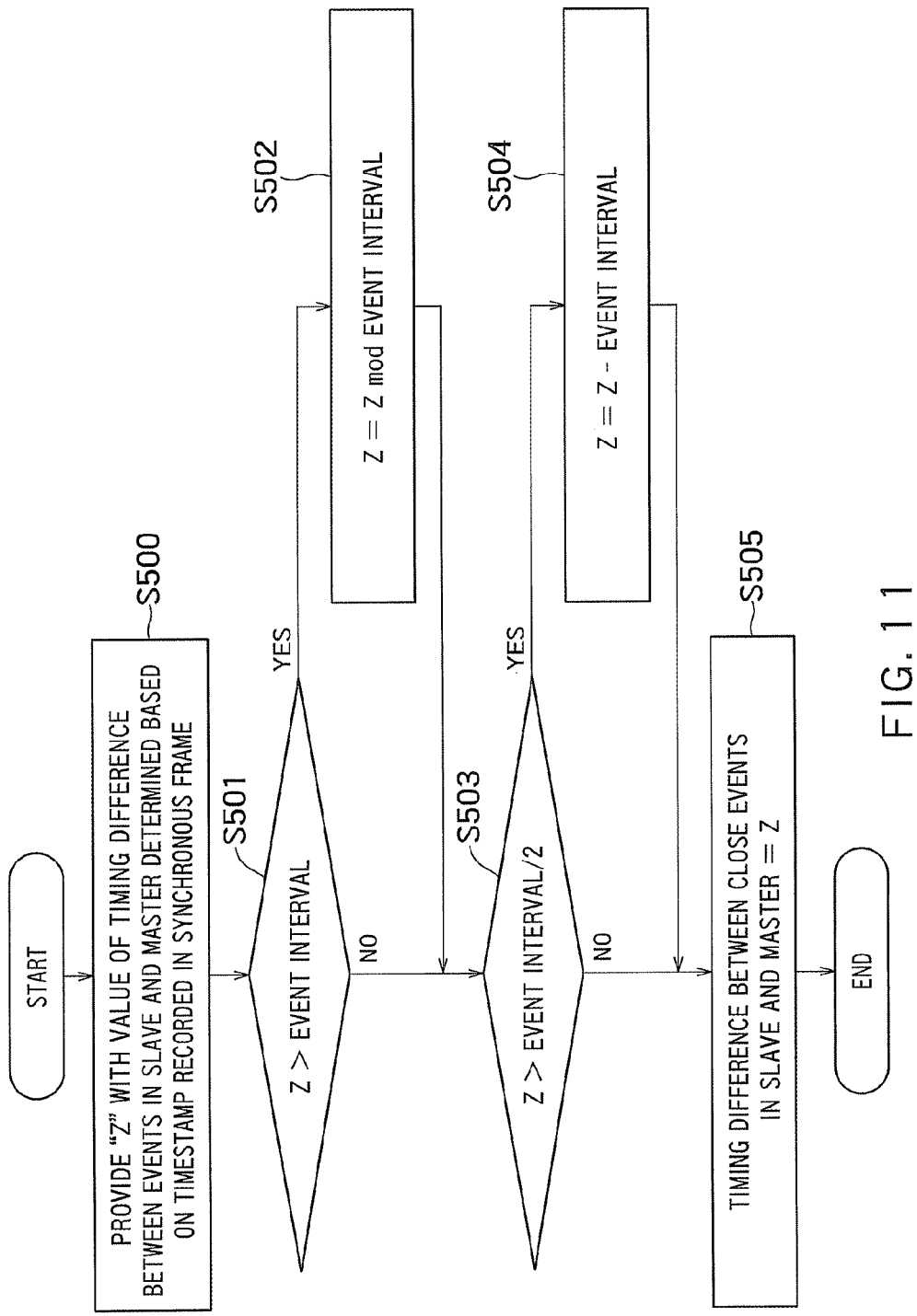
FIG. 11 is a flowchart of a process of estimating a timing difference between temporally close events in the slave and the master according to the first embodiment.

A method for estimating the timing difference between an event in the slave and the temporally closest event in the master will be described with reference to FIG. 11. This process can be applied in the processing in step S204 in FIG. 5.

First, the timing difference between the events in the slave and the master obtained by the calculation method illustrated in step S204 described above is provided for a parameter "Z" (step S500). The parameter "Z" is compared with the default event interval (the same value as that in the master) (step S501).

Then, when the parameter "Z" is greater than the event interval, the parameter "Z" is divided by the event interval to determine the remainder, which is then input to the parameter "Z" (step S502).

When, in step S501, the parameter "Z" is equal to or smaller than the event interval or after step S502 is carried out, the parameter "Z" is compared with half of the event interval (step S503).

When the parameter "Z" is greater than the half of the event interval, the event interval is subtracted from the parameter "Z", and the resultant value is input to the parameter "Z" (step S504).

When, in step S503, the parameter "Z" is determined to be equal to or smaller than the half of the event interval or after step S504 is carried out, the value of the parameter "Z" is determined to be the timing difference between the event in the slave and the temporally closest event in the master (step S505).

The above-described processing allows estimation of the amount of time from generation of an event in the slave until generation of an event in the master temporally closest to the event in the slave (the timing difference between the events in the slave and the master).

Figure 6:
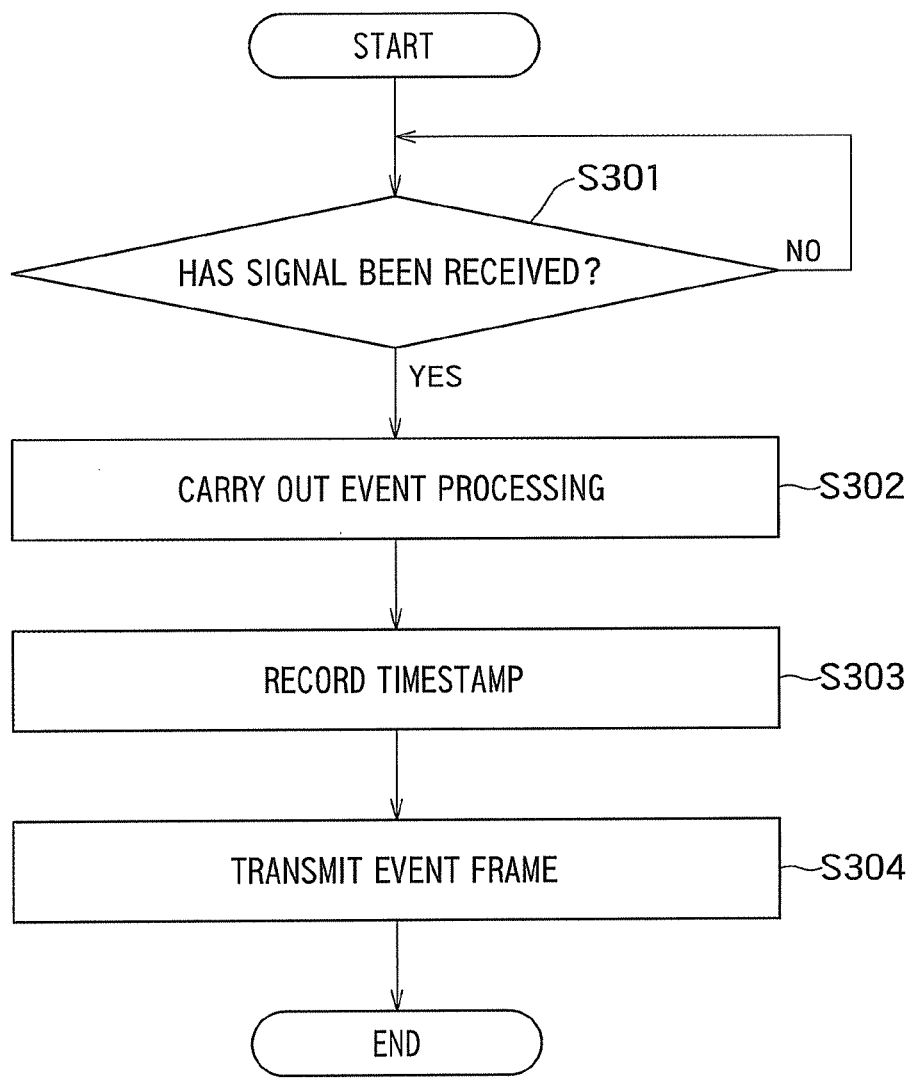
FIG. 6 is a flowchart of event generations in the slave and the master according to the first embodiment.

FIG. 6 is a flowchart showing operations performed by the slave shown in FIG. 2 and the master shown on FIG. 3 during event generation.

First, the event generator 107 or 204 wait until the event generator 107 or 204 receive a signal from the timer 106 or 203 (step S301).

Then, upon receiving the signal from the timer 106 or 203, the event generator 107 or 204 carries out event processing (step S302). For the protective relay assumed in the first embodiment, the event processing involves acquiring the value of the quantity of electricity (a current value or a voltage value) and recording the value in an event frame. Upon receiving the signal from the timer 106 or 203, the event generator 107 or 204 may set the amount of time until the next event in the timer 106 or 203. The slave sets a value stored in the event interval storage 106, and the master sets a predetermined event interval value.

Then, the network processor 101 or 201 generates a timestamp for the time of event generation (the slave event generation timestamp or the master event generation timestamp) and records the timestamp in the event frame (step S303).

Then, the network processor 101 or 201 transmits the event frame to the communication network 102 (step S304). A destination recorded in the event frame is pre-provided and added to the event frame by the event generator or the network processor.

Figure 7:
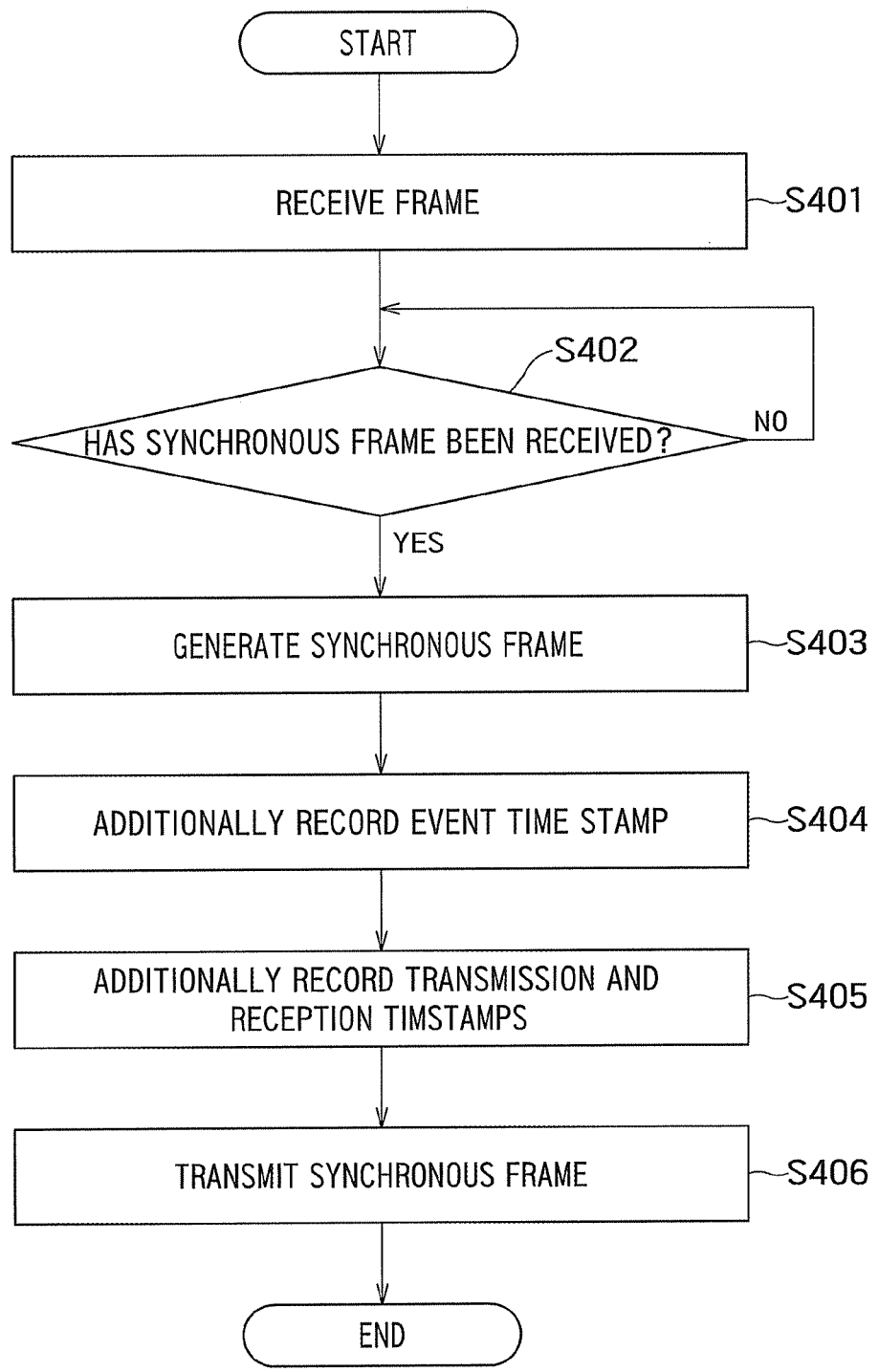
FIG. 7 is a flowchart of a process of receiving a synchronous frame by the master according to the first embodiment.

FIG. 7 is a flowchart showing operations of the master shown in FIG. 3 during reception of a synchronous frame.

First, the network processor 201 receives a frame from the communication network 102 and passes the received frame to the protocol processor 202. At this time, the timestamp (master reception timestamp) "t2" for the time of frame reception is recorded in the timestamp storage 205. Alternatively, the master reception timestamp may be additionally recorded in a predetermined field of the frame (step S401).

Then, the protocol processor 202 determines whether or not the received frame is a synchronous frame (step S402).

When the received frame is not a synchronous frame, processing depending on the type of the frame is carried out, and the system waits again to receive a frame. In this case, the timestamp "t2" recorded in the timestamp storage 205 may be erased. When additionally recorded in the frame, the timestamp "t2" may be neglected during processing of the frame.

When the received frame is a synchronous frame, the protocol processor 202 generates a synchronous frame destined for the slave (step S403). The destined slave may be identified with reference to a source address in the synchronous frame.

Then, the protocol processor 202 acquires the master event generation timestamp from the timestamp storage 205 and additionally records the timestamp in the synchronous frame (step S404). An event for which the timestamp is generated is the latest event generated in the master. However, the event is not limited to the latest event but may be an older event.

Then, the protocol processor 202 records the master event generation timestamp, the master reception timestamp "t2", the master transmission timestamp "t3" in a synchronous frame to be transmitted to the slave (steps S404 and S405). Instead of the timestamps "t3" and "t2", a difference between the above-described two timestamps "t3−t2" may be recorded. The timestamp "t3" desirably represents a time immediately before the network processor 201 carries out transmission. However, the timestamp "t3" may represent a time when the protocol processor 204 generates the synchronous frame.

Furthermore, the synchronous frame received by the master from the slave may contain the slave transmission timestamp "t1" or the slave event generation timestamp. In this case, the timestamp is also recorded in the synchronous frame destined for the slave.

Then, the network processor 201 transmits the synchronous frame destined for the slave (step S406).

As described above, the first embodiment can accurately synchronize the timing of event generation in the slave with the timing of event generation in the master by determining the difference in timing of event generation between the slave and the master based on the time difference between the slave and the master and correcting the information on the event interval in the slave so as to reduce the timing difference. In particular, the event generation in the slave can be quickly and accurately synchronized with the event generation in the master by determining the timing difference between an event in the slave and the temporally closest event in the master.

Second Embodiment

The first embodiment determines the timing difference between events in the slave and the master based on the time difference between the slave and the master and corrects the event interval based on the event timing difference. However, a second embodiment determines the time difference between the slave and the master based on the timing difference between events in the slave and the master, determines a time parameter based on the time difference, and further determines the event interval.

Figure 12:
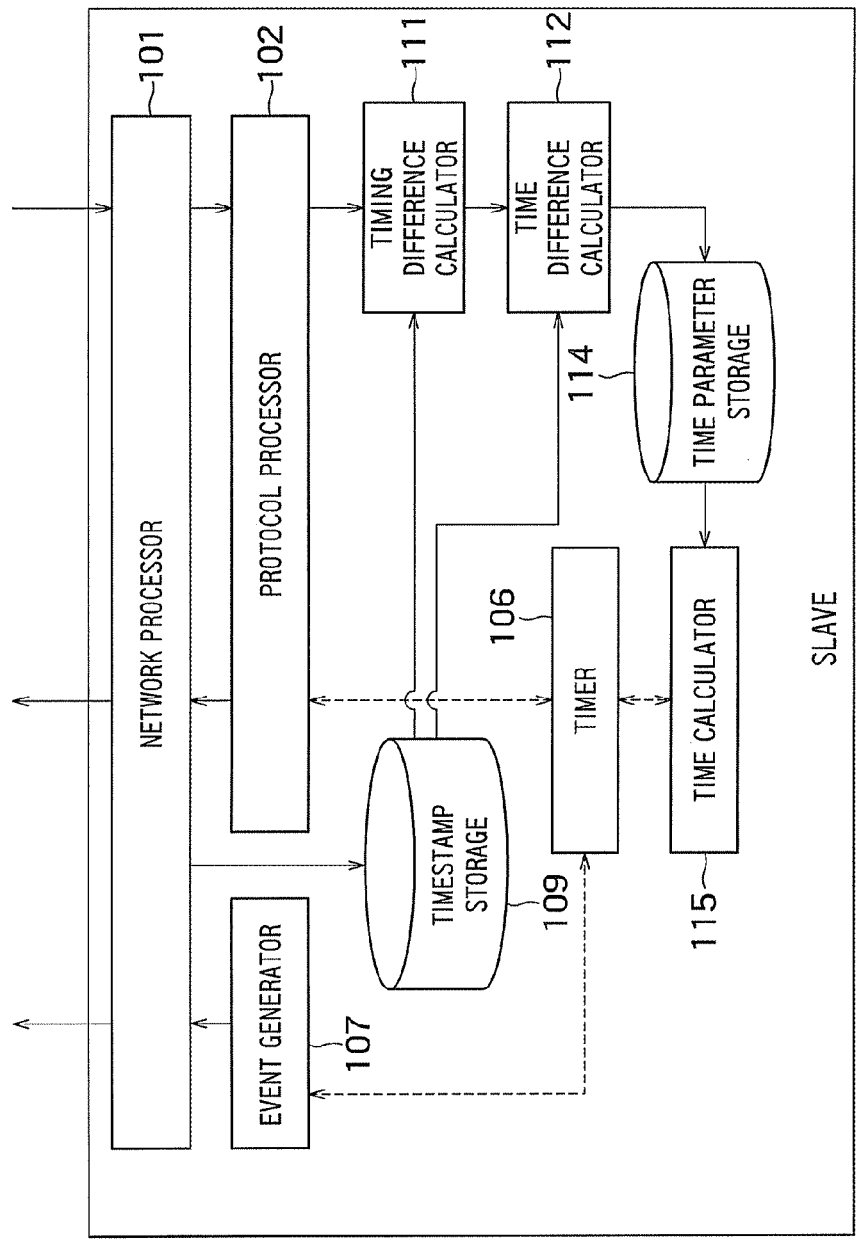
FIG. 12 is a block diagram showing a configuration of a slave according to a second embodiment.

FIG. 12 is a block diagram of a slave according to the second embodiment.

The slave includes a network processor 101, a protocol processor 102, a timing difference calculator 111, a time difference calculator 112, a timestamp storage 109, a timer 106, an event generator 107, a time parameter storage 114, and a time calculator (event interval calculator) 115. A main difference between the second embodiment and the first embodiment is that the time difference calculator 103, the timing difference calculator 104, the event interval corrector 105, and the event interval storage 108 according to the first embodiment are removed and that the timing difference calculator 111, the time difference calculator 112, the time parameter storage 114, and the time calculator 115 are added. Duplicate description of the same processing as that in the first embodiment is omitted except for a changed or expanded part of the processing.

The timing difference calculator 111 utilizes timestamps passed by the protocol processor 102 (the master event generation timestamp and the master reception timestamp) and timestamps in the timestamp storage 109 (the slave reception timestamp and the slave event generation timestamp) to calculate the amount of time from event generation in the slave until event generation in the master (the timing difference between events in the slave and the master). As is the case with the first embodiment, a configuration is also possible in which the timestamps in the timestamp storage 109 are acquired from the protocol processor 102. The timing difference calculator 111 passes the calculated event timing difference to the time difference calculator 112.

The time difference calculator 112 utilizes the timing difference between events in the slave and the master received from the timing difference calculator 111, the master event generation timestamp, and the slave event generation timestamp stored in the timestamp storage 109 to calculate the time difference between the slave and the master.

Furthermore, the slave event generation timestamp and slave transmission timestamp recorded in the timestamp storage 109 in the slave may be utilized. However, the two timestamps may be recorded in a synchronous frame to be transmitted by the slave to the master, then transcribed when the master transmits a synchronous frame to the slave, and received by the slave for utilization.

The time difference calculator 112 obtains the time difference between the slave and the master as a clock offset. Furthermore, a clock rate is calculated as necessary which represents the ratio of time advancement speed of the master to the slave. The clock offset and the clock rate are collectively referred to as a time parameter. A configuration is also possible in which the calculation of the clock rate is omitted. In this case, the value of the clock rate may be set to 1 and then the subsequent processing may be carried out.

The clock rate results from a difference in oscillation frequency between the crystal oscillators in the slave and the master. For the clock rate, for example two synchronization processes (see FIG. 8) are carried out to acquire times "t4(1)" and "t4(2)" in the slave and corresponding times "t4'(1)" and "t4'(2)" in the master. The times "t4'(1)" and "t4'(2)" are obtained by subtracting the time differences (1) and (2) determined by the time difference calculator 112 during the synchronization processes from the times "t4(1)" and "t4(2)" in the slave, respectively. Then, the clock rate can be calculated using "{t4'(1)−t4'(2)}/{t4(1)−t4(2)}". The clock offset may be acquired using the second or first of the two synchronization processes or a synchronization process after the two synchronization processes.

Based on the time parameter (the clock offset and the clock rate) stored in the time parameter storage 114, the time calculator 115 calculates the amount of time (event interval) to be set in the timer 106 in accordance with the following formula.

The amount of time to be set in the timer(event interval)=default event interval×clock rate+clock offset When the calculation of the clock rate is omitted, the clock rate may be set to 1, and the event interval may be calculated using default event interval+clock offset.

When the timer 106 times out to output a signal to the event generator 107, the time calculator 115 calculates the event interval in accordance with the above-described formula, and sets the calculated value in the timer 106 as the amount of time until the next event is generated. When the set amount of time elapses, the timer 106 times out to output a signal to the event generator 107. Thereafter, while the time parameter storage 114 is not updated, the value stored in the time parameter storage 114 is also applied in the next timer process. Subsequently, a synchronization process is repeatedly carried out a plurality of times to sequentially update the value of the time parameter. This allows timings for event generation in the slave to be made closer to timings for event generation in the master to enable event generations to be accurately synchronized.

Figure 14:
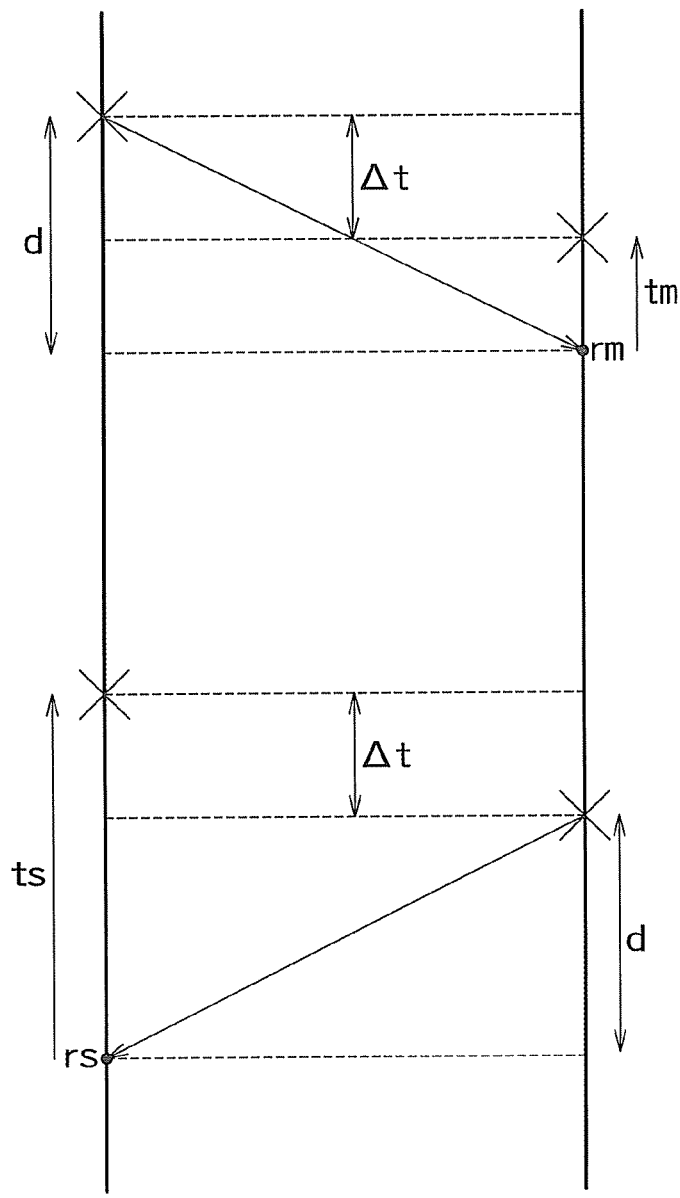
FIG. 14 is a sequence diagram of synchronous frames according to the second embodiment.

FIG. 14 shows a sequence of transmission and reception of synchronous frames according to the second embodiment.

The slave transmits a synchronous frame using event generation as a trigger, and the master also transmits a synchronous frame using event generation as a trigger. Two events are respectively generated during exchange of synchronous frames.

A timestamp representing a time when the master receives a synchronous frame (master reception timestamp) is denoted by "rm". A timestamp representing a time when the slave receives a synchronous frame (slave reception timestamp) is denoted by "rs". The timestamp "rm" and a timestamp for an event generated immediately before "rm" in the master (or a difference between the timestamps) are recorded in a synchronous frame to be transmitted by the master in response to an event generated after "rm", and the synchronous frame is then transmitted the slave.

In the illustrated case, a delay time "d" is the same for the transmission of a synchronous frame from the slave to the master and the transmission of a synchronous frame from the master to the slave. In actuality, "d" is not necessarily the same, and a difference in delay time is an error between calculated "Δt" and actual "Δt". Furthermore, the amount of time from event generation in the slave until event generation in the master is denoted by "Δt". In the illustrated case, both calculated "Δt" and actual "Δt" have the same value. In actuality, the calculated "Δt" and the actual "Δt" are not necessarily the same, and the difference is an error between the calculated "Δt" and the actual "Δt". A difference between the master event generation timestamp and the master reception timestamp "rm" is denoted by "tm". A difference between the slave reception timestamp "rs" and the slave event generation timestamp is denoted by "ts". This will be described below in detail.

Figure 13:
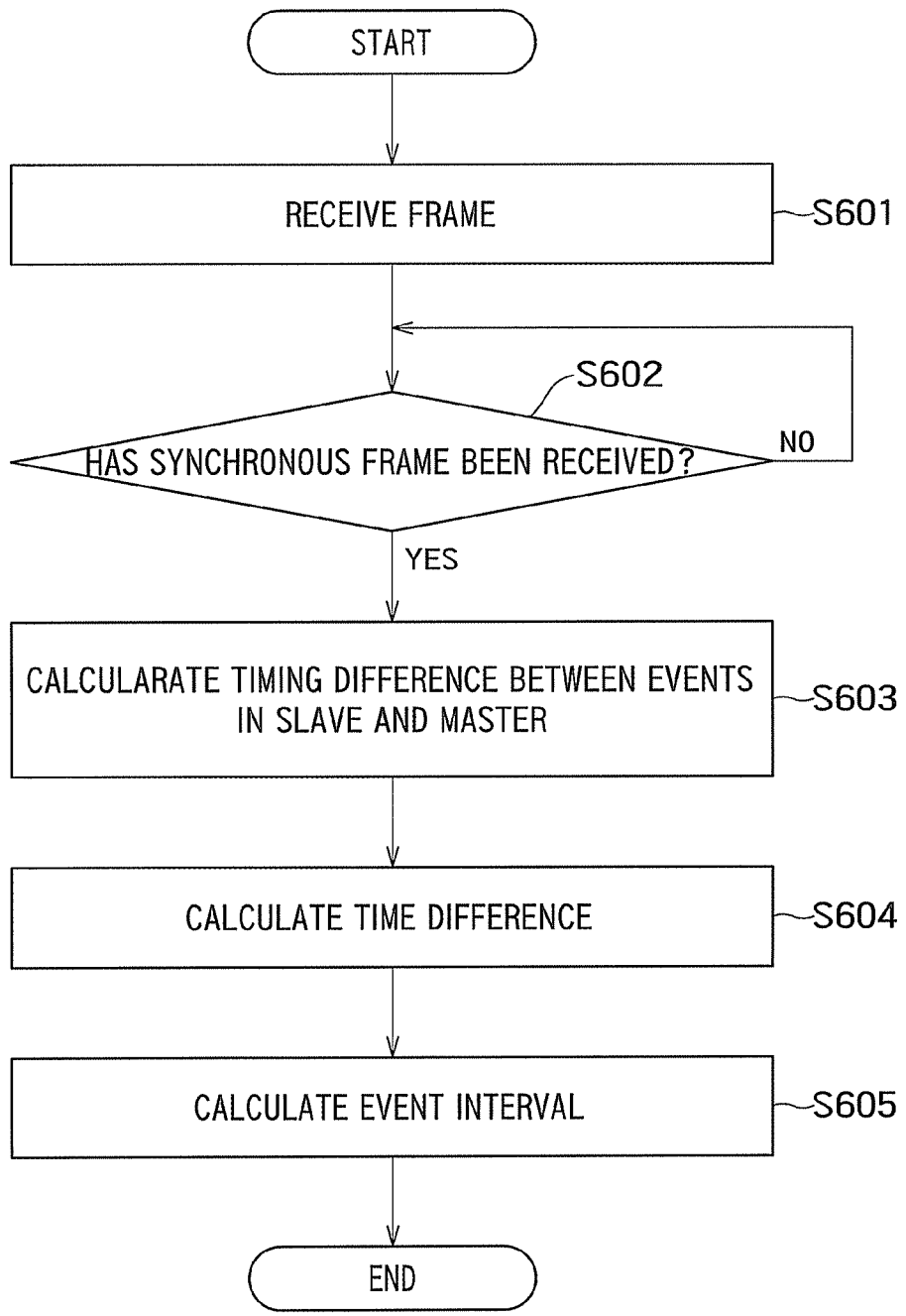
FIG. 13 is a flowchart of a process of receiving a synchronous frame by the slave according to the second embodiment.

FIG. 13 is a flowchart showing operations of the slave according to the second embodiment during reception of a synchronous frame.

First, the network processor 101 receives a frame from the master and passes the frame to the protocol processor 102. At this time, a timestamp (slave reception timestamp) "rs" representing the time of reception of the frame is recorded in the timestamp storage 109. Alternatively, the slave reception timestamp may be additionally recorded in the synchronous frame (step S601).

Then, the protocol processor 102 determines whether or not the received frame is a synchronous frame (step S602). When the received frame is a synchronous frame, the protocol processor 102 passes the master reception timestamp "rm" and master event generation timestamp recorded in the synchronous frame to the timing difference calculator 111.

Then, the timing difference calculator 111 utilizes the timestamps received from the protocol processor 102, the slave reception timestamp, and the slave event generation timestamp to calculate the timing difference between the events in the slave and the master (step S604). The calculated event timing difference and the master event generation timestamp are passed to the time difference calculator 112.

In this case, as shown in FIG. 14, when the difference between the master event generation timestamp and the master reception timestamp "rm" is denoted by "tm" and the difference between the slave reception timestamp "rs" and the slave event generation timestamp is denoted by "ts", the timing difference between the events in the slave and the master is determined in accordance with the following calculation formula.

$$\text{Timing difference} = \frac{ts - tm}{2} = \frac{(d + \Delta t) - (d - \Delta t)}{2} = \Delta t$$

In this case, the timing difference may not be the timing difference between temporally close events in the slave and the master. Thus, the timing difference between the temporally close events in the slave and the master can be estimated by carrying out a conversion process similar to the conversion process shown in FIG. 10 for the first embodiment on the timing difference calculated in accordance with the above-described formula.

Then, the time difference calculator 112 utilizes the timing difference passed by the timing difference calculator 111, the master event generation timestamp, and the slave event generation timestamp passed by the timestamp storage 109 to calculate the time difference between the slave and the master. Then, the time difference is stored in the time parameter storage 114 as a clock offset (step S604). Furthermore, the clock rate is calculated as necessary and stored in the time parameter storage 114. A method for calculating the clock rate is as described above.

The calculation of the time difference between the slave and the master will be described with reference to FIG. 9. FIG. 9 is a diagram illustrating the time difference and timing difference between the slave and the master. The definitions of variables shown in FIG. 9 are as described above.

In FIG. 9, the master event generation timestamp corresponds to "tem", and the slave event generation timestamp corresponds to "st(tes)". The event timing difference received from the timing difference calculator 111 corresponds to the value "tes−tem". On the assumption that the time difference between the slave and the master is equal to or smaller than half of an event period, the time difference between the slave and the master for "st(tes)" is equal to "tes−st(tes)". However, "tes" corresponds to a time in the master reference time when an event is generated in the slave and thus fails to be measured. Thus, using the above-described "event timing difference=tes−tem" allows the time difference between the slave and the master to be expressed as follows.

The time difference between the slave and the master=*tem−st(tes)*+timing difference The method for calculating the time difference between the slave and the master has been described.

The time calculator 115 calculates the amount of time (event interval) to be set in the timer 106 based on the time parameter in the time parameter storage 114 and sets the calculated value in the timer 106 (step S605). A timing for the calculation of the event interval may be a point in time corresponding to the last timeout of the timer 106 or the event interval may be calculated before the last timeout and stored in an internal buffer or a separate storage so that, when the timer 106 times out, the buffered value can be read and set in the timer 106. When the set event interval elapses, the timer 106 generates a signal.

As described above, the second embodiment determines the time difference between the slave and the master based on the timing difference between events in the slave and the master, then determines the time parameter (the clock offset (equal to the time difference itself) or the clock rate) based on the time difference, and determines the next event interval based on the parameter. Repeating such processing enables the event timing in the slave to be made gradually closer to the event timing in the master, allowing the event generation in the slave to be accurately synchronized with the event generation in the master.

Moreover, calculating the time difference based on the timing difference between events enables not only the event synchronization but also diversion of the time difference to measurement of the communication delay, another application that needs synchronization, or the like.

Furthermore, variations described in the first embodiment can be combined with the second embodiment. For example, the first embodiment illustrates the example in which the event interval is adjusted on a step by step basis through a plurality of events. However, in the second embodiment, the event interval may also be reduced on a step by step basis through a plurality of events. The time calculator may change the value for the event interval information each time an event is generated so that the value for the event interval information becomes closer to the calculated value for the event interval information each time an event is generated.

Applying variations as described above enables provision of various synchronization schemes adapted for network environments.

The slave and the master as described above may also be realized using a general-purpose computer device as basic hardware. That is, processing of each block in the slave and the master can be realized by causing a processor mounted in the above general-purpose computer device to execute a program. In this case, the slave and the master may be realized by installing the above described program in the computer device beforehand or may be realized by storing the program in a storage medium such as a CD-ROM or distributing the above described program over a network and installing this program in the computer device as appropriate. Furthermore, the storage in the slave and the master may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus configured for communicating with a master apparatus generating events at a constant time interval via a network, the communication apparatus comprising:
   a clock including a crystal oscillator;
   an event generator, implemented by a computer, configured to generate an event based on the clock in accordance with event interval information specifying a time interval for event generation;
   hardware storage configured to store a first timestamp representing a time when the event is generated in the event generator;
   a receiver configured to receive, from the master apparatus, a frame containing a second timestamp representing a time of an event generated in the master apparatus;
   an event interval corrector, implemented by the computer, configured to correct the event interval information to make a timing of event generation in the event generator closer to a timing of event generation in the master apparatus based on the first timestamp, the second timestamp, and a pre-acquired time difference between the clock and the master apparatus; and
   a timing difference calculator, implemented by the computer, configured to calculate (i) a first timing difference that is a timing difference between the event generated in the master apparatus and the event generated in the event generator based on the first timestamp, the second timestamp, and the time difference and (ii) a second timing difference that is a timing difference between the event generated in the event generator and an event already generated or to be generated in the master apparatus temporally closest to the event generated in the event generator based on the first timing difference and a value of the constant time interval,
   wherein the event interval corrector corrects the event interval information based on the second timing difference.

2. The communication apparatus according to claim 1, further comprising:
   a time difference calculator, implemented by the computer; and
   a transmitter to transmit a first frame to the master apparatus a plurality of times,
   wherein the receiver receives a second frame from the master apparatus for each of the first frames, and each second frame includes a reception timestamp representing a time when the master apparatus receives the corresponding first frame and a transmission timestamp representing a time when the master apparatus transmits the second frame,
   the time difference calculator determines a first minimum value that is a minimum value of a difference between the time when the master apparatus receives the first frame and a time when the first frame is transmitted to the master apparatus; determines a second minimum value that is a minimum value of a difference between a time when the receiver receives the second frame and the time when the master apparatus transmits the second frame; and calculates a delay time in communication with the master apparatus based on the first and second minimum values, and calculates the time difference using the delay time.

3. The communication apparatus according to claim 2, wherein the time difference calculator calculates the time difference based on a time when the master apparatus transmits, among second frames transmitted by the master apparatus, the second frame for which the second minimum value is obtained, a time when the frame receiver receives that second frame, and the delay time.

4. A communication system comprising:
   the communication apparatus according to claim 1; and
   the master apparatus.

5. The communication system according to claim 4, wherein the communication system is a protective relay system.

6. A communication method for communicating with a master apparatus generating events at a constant time interval via a network, comprising:
   generating an event by use of a clock including a crystal oscillator, in accordance with event interval information specifying a time interval for event generation;
   storing a first timestamp representing a time when the event is generated, in hardware storage;
   receiving, from the master apparatus, a frame containing a second timestamp representing a time of an event generated in the master apparatus;

correcting the event interval information so as to make a timing of event generation closer to a timing of event generation in the master apparatus based on the first timestamp, the second timestamp, and a pre-acquired time difference between the clock and the master apparatus; and calculating (i) a first timing difference that is a timing difference between the event generated in the master apparatus and the generated event, based on the first timestamp, the second timestamp, and the time difference and (ii) a second timing difference that is a timing difference between the generated event and an event already generated or to be generated in the master apparatus temporally closest to the generated event based on the first timing difference and a value of the constant time interval, wherein the event interval information is corrected based on the second timing difference.

* * * * *